(12) United States Patent
Kim (10) Patent No.: US 9,849,866 B2
(45) Date of Patent: Dec. 26, 2017

(54) PISTON PUMP ASSEMBLY OF ELECTRONIC CONTROLLED BRAKE DEVICE FOR VEHICLE

(71) Applicant: MANDO CORPORATION, Pyeongtaek-si (KR)

(72) Inventor: Yong Kap Kim, Suwon-si (KR)

(73) Assignee: MANDO CORPORATION, Gyeonggi-do (KR)

( * ) Notice: Subject to any disclaimer, the term of this patent is extended or adjusted under 35 U.S.C. 154(b) by 344 days.

(21) Appl. No.: 14/681,033

(22) Filed: Apr. 7, 2015

(65) Prior Publication Data
US 2015/0292492 A1    Oct. 15, 2015

(30) Foreign Application Priority Data
Apr. 10, 2014    (KR) .......................... 10-2014-0042928

(51) Int. Cl.
*F04B 19/00* (2006.01)
*B60T 8/40* (2006.01)
(Continued)

(52) U.S. Cl.
CPC .......... *B60T 8/4031* (2013.01); *F04B 1/0452* (2013.01); *F04B 53/001* (2013.01); *F04B 53/101* (2013.01); *F04B 53/1002* (2013.01)

(58) Field of Classification Search
CPC .... B60T 8/4031; F04B 1/0452; F04B 53/001; F04B 53/101; F04B 53/1002
(Continued)

(56) References Cited

U.S. PATENT DOCUMENTS 4,640,098 A * 2/1987 Brademeyer ......... B60T 11/224
                                                       137/433
4,895,499 A * 1/1990 Gargas ................ F04B 53/1002
                                                       137/539.5
(Continued)

FOREIGN PATENT DOCUMENTS

CN          1508431         6/2004
DE         19743186         4/1999
(Continued)

OTHER PUBLICATIONS

Office Action dated Sep. 1, 2016 for Chinese Patent Application No. 201510169369.X and its English summary, and machine translation by Google Translate.

*Primary Examiner* — Charles Freay
(74) *Attorney, Agent, or Firm* — Ladas & Parry, LLP (57) ABSTRACT

A piston pump assembly of an electronic controlled brake device for a vehicle includes: an inlet housing configured to accommodate a reciprocating piston and elastically support the piston; an outlet housing configured to accommodate the inlet housing and form a working chamber that allows a working fluid to be introduced from the inlet housing; an outlet ball valve accommodated in the working chamber to open and close a flow passage of the working fluid that is introduced from the inlet housing to the outlet housing; an outlet spring accommodated in the working chamber to elastically support the outlet ball valve toward the inlet housing; and a damper accommodated in the working chamber and mounted within the outlet spring to allow shape deformation while contacting the outlet ball valve. When the outlet ball valve is pushed and pressed toward an end of the working chamber, the damper generates viscous damping while discharging the accommodated working fluid into the working chamber. Accordingly, it is possible to actively reduce noise or vibration upon initial operation of the electronic controlled brake device or in a low frequency section, thereby improving ride comfort.

10 Claims, 6 Drawing Sheets

(51) Int. Cl.
*F04B 1/04* (2006.01)
*F04B 53/00* (2006.01)
*F04B 53/10* (2006.01)

(58) Field of Classification Search
USPC .............................. 137/539, 539.5; 251/64
See application file for complete search history.

(56) References Cited

U.S. PATENT DOCUMENTS

| | | | |
|---|---|---|---|
| 5,368,454 A * | 11/1994 | Powers | F04B 53/101 |
| | | | 137/533.11 |
| 6,276,909 B1 * | 8/2001 | Siegel | B60T 8/4031 |
| | | | 417/470 |
| 2004/0166004 A1 * | 8/2004 | Schmitt | B60T 8/4031 |
| | | | 417/470 |
| 2004/0234400 A1 * | 11/2004 | Schepp | B60T 8/4031 |
| | | | 417/471 |
| 2014/0069093 A1 * | 3/2014 | Kim | B60T 8/409 |
| | | | 60/553 |

FOREIGN PATENT DOCUMENTS

| | | |
|---|---|---|
| DE | 19847471 A1 * | 12/1999 |
| DE | 102009047456 | 6/2011 |
| DE | 102011007178 | 10/2012 |
| JP | 11-501571 | 2/1999 |
| JP | 2000-120528 | 4/2000 |
| KR | 2002-0069784 | 9/2002 |

* cited by examiner

PISTON PUMP ASSEMBLY OF ELECTRONIC CONTROLLED BRAKE DEVICE FOR VEHICLE

CROSS-REFERENCE(S) TO RELATED APPLICATION

This application claims priority of Korean Patent Application No. 10-2014-0042928, filed on Apr. 10, 2014, in the Korean Intellectual Property Office, which is hereby incorporated by reference in its entirety.

BACKGROUND OF THE INVENTION

Field of the Invention

The present invention relates to a piston pump assembly of an electronic controlled brake device for a vehicle, and more particularly, to a piston pump assembly of an electronic controlled brake device for a vehicle, which actively reduces noise or vibration upon initial operation of the electronic controlled brake device or in a low frequency section, thereby improving ride comfort.

Description of the Related Art

Recently, electronic controlled brake systems have evolved into always-on systems, such as an active hydraulic booster or a smart cruise control (SCC) which allows a vehicle to maintain a constant speed, as well as an anti-lock brake system (ABS) or an electronic stability control system, which is activated in emergency situations.

Figure 9:
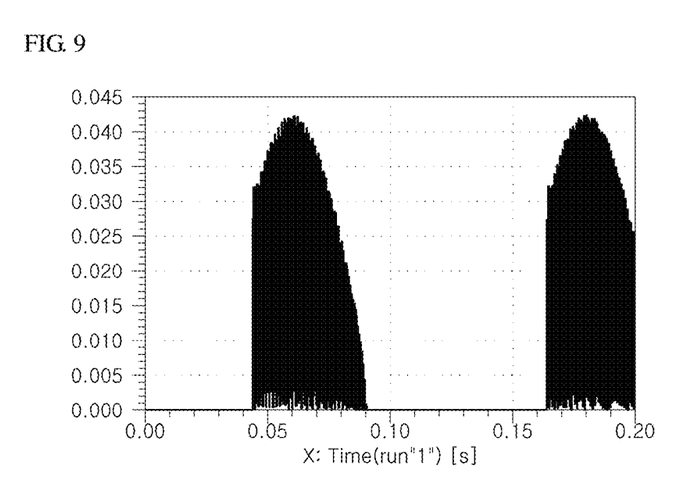
FIG. 9 is a graph illustrating an attenuation behavior of an outlet ball valve of an existing pump system.

One of problems occurring in an existing piston pump is that a flow of a working fluid is opened and closed at a high speed due to chattering phenomenon of an outlet ball provided in an outlet housing of the pump at a motor speed in a low frequency section, and thus, serious hydraulic pulsation occurs as illustrated in a graph of FIG. 9, causing noise.

A driver easily feels small vibration or noise when the electronic controlled brake system is driven. Therefore, there is a need for a technology and a device which can reduce noise and vibration.

CITATION LIST

Patent Literature (Patent Literature 1) German Patent No. DE19743186
(Patent Literature 2) Japanese Patent Laid-Open No. 2000-120528
(Patent Literature 3) Korean Patent Application No. 10-2001-0010223

SUMMARY OF THE INVENTION

An aspect of the present invention is directed to a piston pump assembly of an electronic controlled brake device for a vehicle, which actively reduces noise or vibration upon initial operation of the electronic controlled brake device or in a low frequency section to thereby improve ride comfort.

According to an embodiment of the present invention, a piston pump assembly of an electronic controlled brake device for a vehicle includes: an inlet housing configured to accommodate a reciprocating piston and elastically support the piston; an outlet housing configured to accommodate the inlet housing and form a working chamber that allows a working fluid to be introduced from the inlet housing; an outlet ball valve accommodated in the working chamber to open and close a flow passage of the working fluid that is introduced from the inlet housing to the outlet housing; an outlet spring accommodated in the working chamber to elastically support the outlet ball valve toward the inlet housing; and a damper accommodated in the working chamber and mounted within the outlet spring to allow shape deformation while contacting the outlet ball valve.

When the outlet ball valve is pushed and pressed toward an end of the working chamber, the damper may generate viscous damping while discharging the accommodated working fluid into the working chamber.

The damper may be made of an elastic material and be formed to have a cylindrical shape or a polygonal prism shape such that one end thereof contacts the end of the working chamber and the other end thereof contacts the outlet ball valve.

The damper may have elasticity and have a porous structure having a plurality of fine holes capable of accommodating the working fluid in surfaces and inside thereof.

The damper may include: a damper body having one end contacting an end of the working chamber and the other end contacting the outlet ball valve; at least one first through-passage passing through both ends of the damper body; and at least one second through-passage bypassed from the first through-passage and communicating with the working chamber through a side of the damper body.

The damper may include: a damper body having elasticity and having a cylindrical shape such that one end thereof contacts an end of the working chamber and the other end thereof contacts the outlet ball valve; a core flow passage disposed in a central portion of the damper body to pass through both ends of the damper body; and third through-passages extending from the core flow passage and radially disposed toward an outer circumferential surface of the damper body to communicate with the working chamber through the outer circumferential surface of the damper body.

The third through-passages may be formed to have an involute curve shape extending from the core flow passage toward the outer circumferential surface of the damper body.

The third through-passages may be formed such that a plurality of layers are formed in a length direction of the core flow passage, and ends of the third through-passages are disposed along the outer circumferential surface of the damper body in multiple rows and multiple columns.

The damper may include: a damper body having elasticity and having one end contacting an end of the working chamber and the other end contacting the outlet ball valve; a plurality of fourth through-passages passing through both ends of the damper body and having ends disposed in a ring shape in one end surface and the other end surface of the damper body; and a plurality of fifth through-passages extending from the plurality of fourth through-passages to sides of the damper body and communicating with the working chamber.

The fifth through-passages may be formed to have an involute curve shape extending from the fourth through-passages toward an outer circumferential surface of the damper body.

The fifth through-passages may be formed such that a plurality of layers are formed in a length direction of the fourth through-passages, and ends of the third through-passages are disposed along an outer circumferential surface of the damper body in multiple rows and multiple columns.

DETAILED DESCRIPTION OF EXEMPLARY EMBODIMENTS

The advantages and features of the present invention and methods for achieving them will become more apparent from the following embodiments that are described in detail in conjunction with the accompanying drawings.

However, the present invention is not limited to the following embodiments and may be embodied in various forms.

These embodiments are provided so that this disclosure will be thorough and complete, and will fully convey the scope of the invention to those skilled in the art.

The scope of the present invention is defined by the appended claims.

Therefore, in some embodiments, detailed descriptions of well-known elements, operations, and technologies will be omitted since they would unnecessarily obscure the subject matters of the present invention.

Throughout the disclosure, like reference numerals refer to like elements. The terminology used herein is for the purpose of describing particular embodiments only and is not intended to be limiting of the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless otherwise defined, all terms used herein, including technical and scientific terms, have the same meaning as commonly understood by one of ordinary skill in the art to which the inventive concept belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described with reference to the accompanying drawings.

Figure 1:
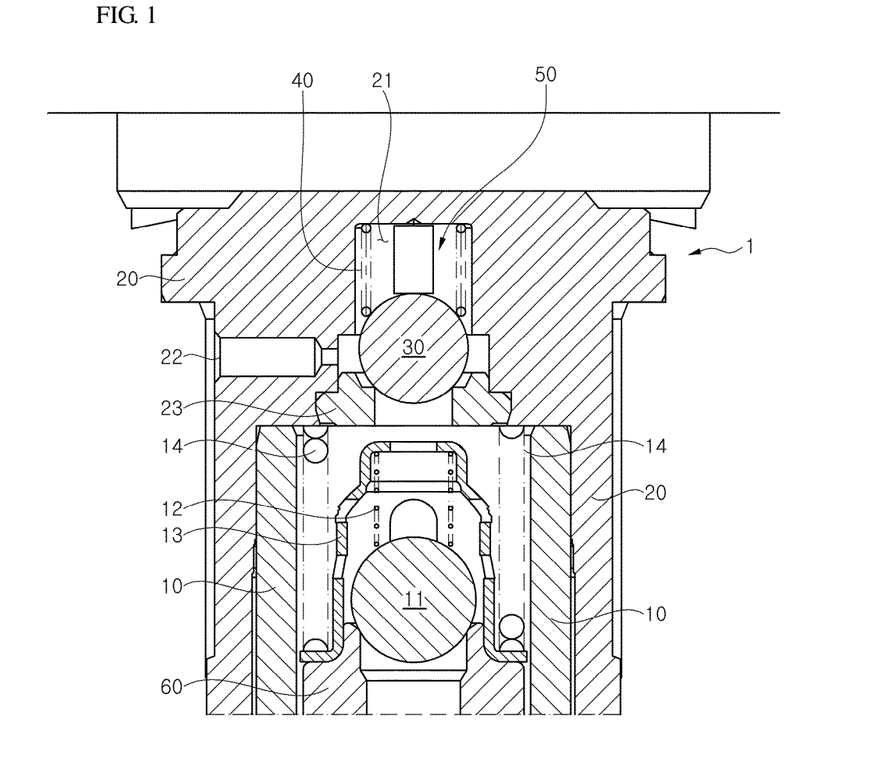
FIG. 1 is a partial cross-sectional conceptual view illustrating an internal structure of a piston pump assembly of an electronic controlled brake device for a vehicle according to an embodiment of the present invention.

FIG. 1 is a partial cross-sectional conceptual view illustrating an internal structure of a piston pump assembly of an electronic controlled brake device for a vehicle according to an embodiment of the present invention.

For reference, in FIG. 1, reference numeral 11 represents an inlet ball valve, reference numeral 12 represents an inlet ball valve support spring, reference numeral 13 represents a spring cage, and reference numeral 14 represents a reset spring.

As illustrated in FIG. 1, the piston pump assembly 1 according to the present invention is configured such that an outlet ball valve 30, an outlet spring 40, and a damper 50 are mounted within an outlet housing 20 that accommodates an inlet housing 10.

The inlet housing 10 constitutes the piston pump assembly 1 of the electronic controlled brake device for a vehicle and has a space in which a reciprocating piston 60 is accommodated and is elastically supported.

The outlet housing 20 accommodates the inlet housing 10 and forms a working chamber 21 that allows a working fluid to be introduced from the inlet housing 10. The outlet housing 20 includes an outlet port 22 at one side thereof and forms a space for accommodating the outlet ball valve 30, the outlet spring 40, and the damper 50, which will be described below.

The outlet ball valve 30 is formed to have a spherical shape such that the outlet ball valve 30 is accommodated in the working chamber 21 and is supported by an outlet ball valve sheet 23. The outlet ball valve 30 opens or closes a flow passage of the working fluid that is introduced from the inlet housing 10 to the outlet housing 20.

The outlet spring 40 is accommodated in the working chamber 21 and supports the outlet ball valve 30 elastically toward the inlet housing 10.

The damper 50 is accommodated in the working chamber 21 and is mounted within the outlet spring 40 to allow shape deformation while contacting the outlet ball valve 30.

That is, the damper 50 serves to mitigate rapid movement of the outlet ball valve 30 in order to prevent an occurrence of noise and vibration due to hydraulic pulsation caused by that phenomenon in which chattering of the outlet ball valve 30 occurs in a low frequency section and a flow of the working fluid is opened and closed at a high speed.

In other words, the damper 50 exhibits nonlinear elastic behavior to complement primary linear elastic behavior of the outlet spring 40, that is, spring characteristics.

That is, the damper 50 exhibits the nonlinear elastic behavior with respect to a speed of the working fluid. When the speed of the working fluid is high, the damper 50 provides a stronger elastic repulsive force, and when the speed of the working fluid is low, the damper 50 provides a weak elastic repulsive force.

When the discharged working fluid moves through the inside of the working chamber 21, a viscous layer is formed on an inner circumferential surface of the working chamber 21, thus generating a damping force. The damping force is associated with a function of a speed. Therefore, as the working fluid is discharged through the outlet port 22 at a higher speed, a stronger damping force may be generated.

Therefore, a high frequency component generated when the outlet ball valve 30 is vibrated is effectively blocked by the damper 50, thereby considerably reducing noise and vibration.

In addition to the above-described embodiment, the following various embodiments can also be applied to the present invention.

First, the damper 50 may be made of an elastic material, such as a sponge, such that when the outlet ball valve 30 is pushed and pressed toward an end of the working chamber 21, viscous damping is generated while the working fluid accommodated therein is discharged into the working chamber 21.

To this end, the damper 50 is pressed in a flow-passage opened state in which the outlet ball valve 30 allows the working fluid to be introduced from the inlet housing 10, and generates viscous damping by discharging the working fluid accommodated within the damper 50.

Figure 2:
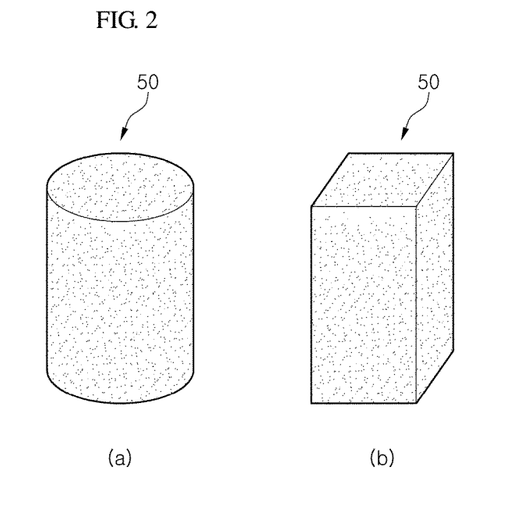
FIGS. 2 to 7 are conceptual views illustrating structure of dampers, which are main component of a piston pump assembly of an electronic controlled brake device for a vehicle, according to various embodiments of the present invention.

As described above, the damper 50 is configured to provide the elastic damping, and as illustrated in FIGS. 1 and 2, the damper 50 is made of an elastic material and formed to have a cylindrical shape (see FIG. 2A) or a polygonal prism shape (see FIG. 2B) such that one end thereof contacts the end of the working chamber 21 and the other end thereof contacts the outlet ball valve 30.

As described above, the damper 50, which provides the viscous damping, may be made of a material having the same characteristics as a sponge. In addition, the damper 50 may be made of a material having the same characteristics as rubber, which blocks a high frequency component generated when the outlet ball valve 30 shakes, while maintaining the state of contacting the outlet ball valve 30, thereby reducing noise and vibration.

As described above, it is preferable that the damper 50 has a porous structure having a plurality of fine holes capable of accommodating the working fluid in the surfaces and the inside thereof so as to discharge the accommodated working fluid into the working chamber 21 due to the pressure caused by the opening of the flow passage of the outlet ball valve 30.

In this case, the damper 50 may have a porous structure as described above and may form flow passages in various arrangements as illustrated in FIGS. 3 to 7 so as to discharge the working fluid.

Figure 3:
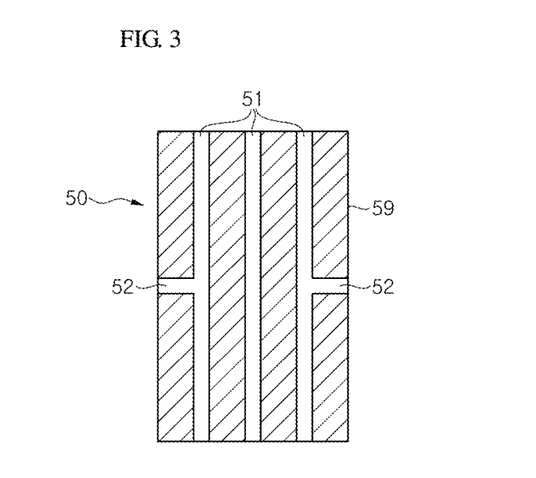

That is, as illustrated in FIG. 3, the damper 50 may be configured such that first and second flow passages 51 and 52 are formed in a damper body 59.

The damper body 59 has elasticity and has one end contacting the end of the working chamber 21 and the other end contacting the outlet ball valve 30.

The first through-passages 51 form one or more flow passages that pass through both ends of the damper body 59.

At least one second through-passage 52 is bypassed from the first through-passage 51 and forms flow passages that communicate with the working chamber 21 through the sides of the damper body 59.

Figure 4:
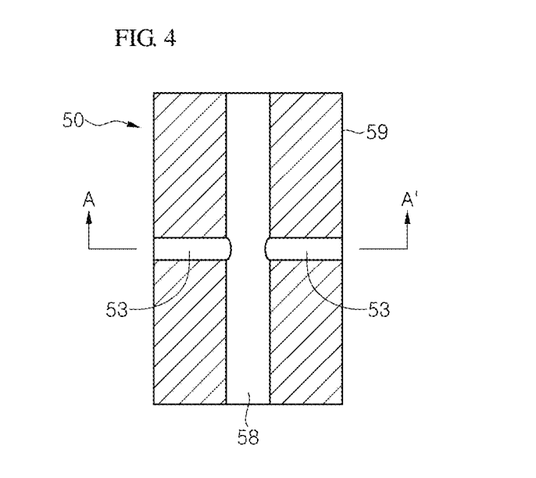
Figure 5:
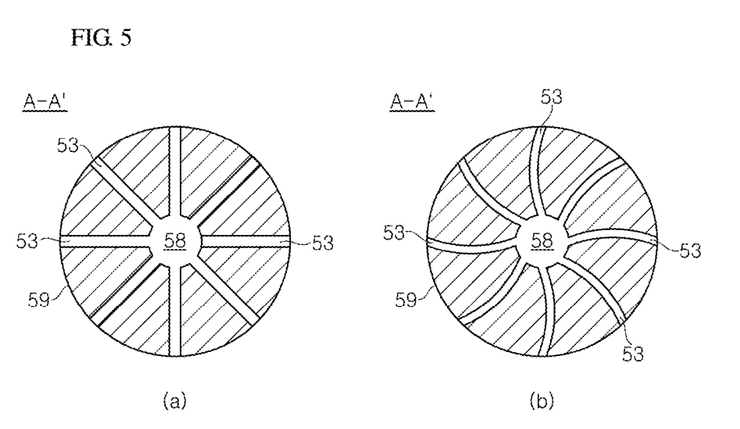

As illustrated in FIGS. 4 and 5, the damper 50 may be configured such that a core flow passage 58 and third through-passages 53 are formed in the damper body 59.

The core flow passage 58 forms a flow passage disposed in a central portion of the damper body 59 so as to pass through both ends of the damper body 59.

The third through-passages 53 extend from the core flow passage 58 and are radially disposed toward an outer circumferential surface of the damper body 59. The third through-passages 53 form flow passages that communicate with the working chamber 21 through the outer circumferential surface of the damper body 59.

The third through-passage 53 may be formed to have a straight-line shape as illustrated in FIG. 5A, or may be formed to have an involute curve shape extending from the core flow passage 58 toward the outer circumferential surface of the damper body 59 as illustrated in FIG. 5B. In this manner, the nonlinear elastic behavior can be realized more reliably.

Figure 6:
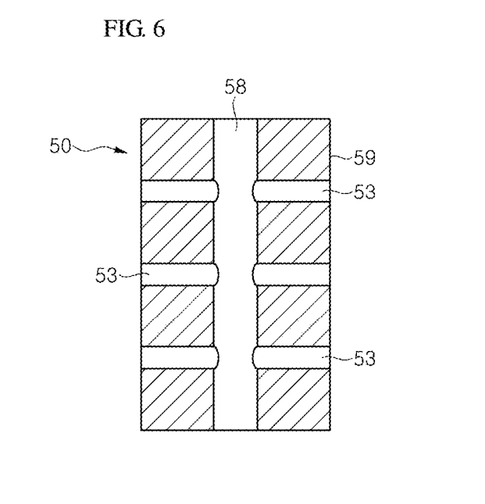

In addition, as illustrated in FIG. 6, the third through-passages 53 may be configured such that a plurality of layers are formed in a length direction of the core flow passage 58 and ends of the third through-passages 53 are disposed along the outer circumferential surface of the damper body in multiple rows and multiple columns, so as to accommodate and discharge a larger amount of the working fluid.

Figure 7:
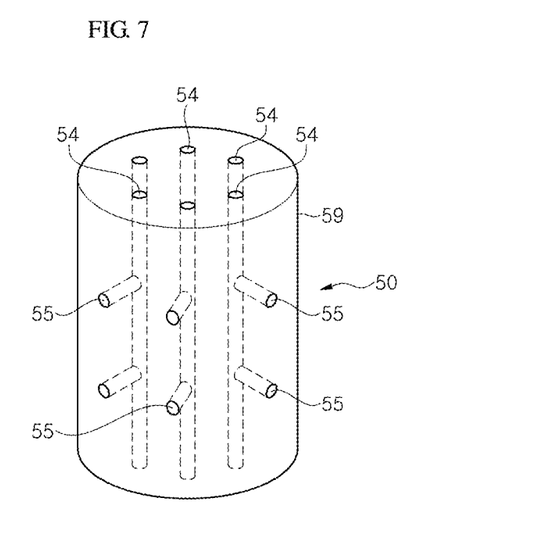

On the other hand, as illustrated in FIG. 7, the damper 50 may be configured such that fourth through-passages 54 and fifth through-passages 55 are formed in the damper body 59.

That is, the fourth through-passages 54 pass through both ends of the damper body 59 and form a plurality of flow passages, ends of which are disposed in one end surface and the other end surface of the damper body 59 in a ring shape.

The fifth through-passages 55 extend from the plurality of fourth through-passages 54 to the sides of the damper body 59 and form a plurality of flow passages that communicate with the working chamber 21.

Although not particularly illustrated, the fifth through-passages 55 may be formed to have an involute curve shape extending from the fourth through-passages 54 toward the outer circumferential surface of the damper body 59, or may be formed to have a straight-line shape as illustrated.

As illustrated, the fifth through-passages 55 may be configured such that a plurality of layers are formed in a length direction of the fourth through-passages 54 and ends of the fifth through-passages 55 are disposed along the outer circumferential surface of the damper body 59 in multiple rows and multiple columns.

Figure 8A:
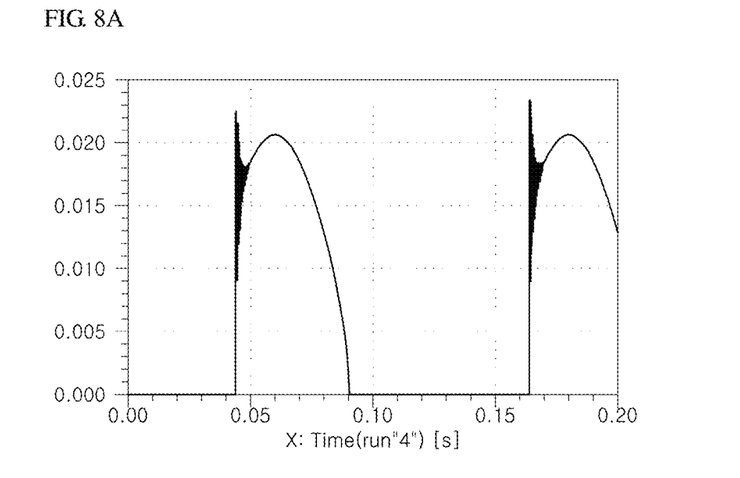
FIGS. 8A and 8B are diagrams for comparison between an ideal attenuation behavior and an attenuation behavior of the piston pump assembly of the electronic controlled brake device for a vehicle according to the embodiment of the present invention.
Figure 8B:
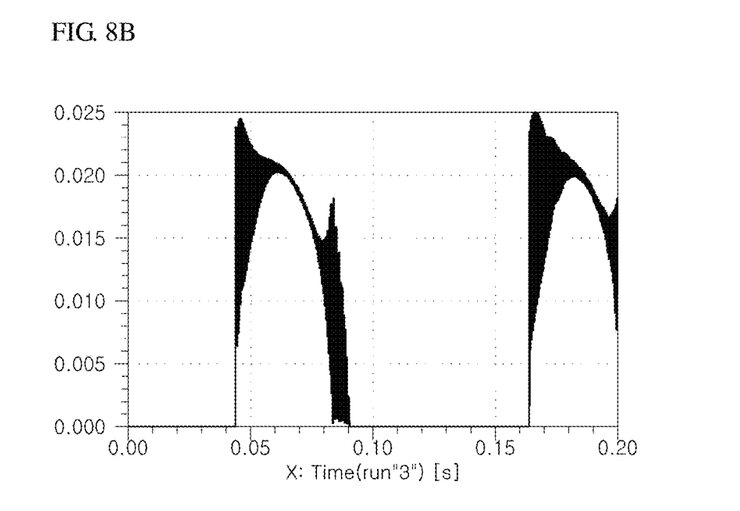

From comparison between an attenuation behavior of FIG. 8B, which is exhibited when the piston pump assembly including the damper 50 according to the above-described various embodiments is applied, and an ideal attenuation behavior of FIG. 8A, it can be seen that the graph of the attenuation behavior of the piston pump assembly according to the embodiment of the present invention is close to the ideal graph of FIG. 8B.

According to the present invention as described above, it is possible to provide the damper that elastically supports the outlet ball valve along with the outlet spring. When the pump is activated, the damper reduces chattering phenomenon due to vibration of the outlet ball valve and forms the viscous layer of the working fluid to provide a damping force, thereby reducing noise and vibration caused by pulsation and improving ride comfort.

As described above, the present invention provides the piston pump assembly of the electronic controlled brake device for a vehicle, which actively reduces noise or vibration upon initial operation of the electronic controlled brake device or in a low frequency section to thereby improve ride comfort.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 1: piston pump assembly | 10: inlet housing |
| 11: inlet ball valve | 12: inlet ball valve support spring |
| 13: spring cage | 14: reset spring |
| 20: outlet housing | 21: working chamber |
| 22: outlet port | 23: outlet ball valve sheet |
| 30: outlet ball valve | 40: outlet spring |
| 50: damper | 51: first through-passage |
| 52: second through-passage | 53: third through-passage |
| 54: fourth through-passage | 55: fifth through-passage |
| 58: core flow passage | 59: damper body |
| 60: piston | |

What is claimed is:

1. A piston pump assembly of an electronic controlled brake device for a vehicle, the piston pump assembly comprising:
   an inlet housing configured to accommodate a reciprocating piston;
   an outlet housing configured to accommodate the inlet housing and form a working chamber that allows a working fluid to be introduced from the inlet housing;
   an outlet ball valve accommodated in the working chamber to open and close a flow passage of the working fluid that is introduced from the inlet housing to the outlet housing;
   an outlet spring accommodated in the working chamber to elastically support the outlet ball valve toward the inlet housing; and
   a damper accommodated in the working chamber and mounted within the outlet spring to allow shape deformation while contacting the outlet ball valve,
   wherein the damper has a porous structure having a plurality of fine holes capable of accommodating the working fluid in surfaces and inside thereof.

2. The piston pump assembly according to claim 1, wherein when the outlet ball valve is pushed and pressed toward an end of the working chamber, the damper generates viscous damping while discharging the working fluid accommodated therein into the working chamber.

3. The piston pump assembly according to claim 1, wherein the damper is made of an elastic material and is formed to have a cylindrical shape or a polygonal prism shape such that one end thereof contacts the end of the working chamber and the other end thereof contacts the outlet ball valve.

4. The piston pump assembly according to claim 1, wherein the damper includes:
   a damper body having one end contacting an end of the working chamber and the other end contacting the outlet ball valve;
   at least one first through-passage passing through both ends of the damper body; and
   at least one second through-passage bypassed from the first through-passage and communicating with the working chamber through a side of the damper body.

5. The piston pump assembly according to claim 1, wherein the damper includes:
   a damper body having a cylindrical shape such that one end thereof contacts an end of the working chamber and the other end thereof contacts the outlet ball valve;
   a core flow passage disposed in a central portion of the damper body to pass through both ends of the damper body; and
   first through-passages extending from the core flow passage and radially disposed toward an outer circumferential surface of the damper body to communicate with the working chamber through the outer circumferential surface of the damper body.

6. The piston pump assembly according to claim 5, wherein the first through-passages are formed to have an involute curve shape extending from the core flow passage toward the outer circumferential surface of the damper body.

7. The piston pump assembly according to claim 5, wherein the first through-passages form a plurality of layers in a length direction of the core flow passage, and ends of the first through-passages are disposed along the outer circumferential surface of the damper body in multiple rows and multiple columns.

8. The piston pump assembly according to claim 1, wherein the damper includes:
   a damper body having one end contacting an end of the working chamber and the other end contacting the outlet ball valve;
   a plurality of first through-passages passing through both ends of the damper body and having ends disposed in a ring shape in one end surface and the other end surface of the damper body; and
   a plurality of second through-passages extending from the plurality of first through-passages to sides of the damper body and communicating with the working chamber.

9. The piston pump assembly according to claim 8, wherein the second through-passages are formed to have an involute curve shape extending from the first through-passages toward an outer circumferential surface of the damper body.

10. The piston pump assembly according to claim 8, wherein the second through-passages form a plurality of layers in a length direction of the second through-passages, and ends of the second through-passages are disposed along an outer circumferential surface of the damper body in multiple rows and multiple columns.

* * * * *